US012670921B1

(12) United States Patent
Wojcicki et al.

(10) Patent No.: US 12,670,921 B1
(45) Date of Patent: Jun. 30, 2026

(54) STRUCTURED EXTENSION OF SPEECH BANDWIDTH WITH DENOISING

(71) Applicant: Cisco Technology, Inc., San Jose, CA (US)

(72) Inventors: Kamil K. Wojcicki, Kangaroo Point (AU); Pramod Bhaskar Bachhav, Cracow (PL); Mansur Yesilbursa, Cracow (PL); Samer Lutfi Hijazi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 277 days.

(21) Appl. No.: 18/469,691

(22) Filed: Sep. 19, 2023

Related U.S. Application Data

(60) Provisional application No. 63/470,005, filed on May 31, 2023.

(51) Int. Cl.

| | |
|---|---|
| ***G10L 21/0232*** | (2013.01) |
| ***G10L 25/18*** | (2013.01) |
| ***G10L 25/30*** | (2013.01) |

(52) U.S. Cl.
CPC .......... *G10L 21/0232* (2013.01); *G10L 25/18* (2013.01); *G10L 25/30* (2013.01)

(58) Field of Classification Search
CPC ...... G10L 21/0232; G10L 25/18; G10L 25/30
See application file for complete search history.

(56) References Cited

U.S. PATENT DOCUMENTS

| | | | | |
|---|---|---|---|---|
| 5,978,759 | A | 11/1999 | Tsushima et al. | |
| 6,895,375 | B2 | 5/2005 | Malah et al. | |
| 8,433,582 | B2 * | 4/2013 | Ramabadran | G10L 21/038 704/226 |
| 9,258,428 | B2 | 2/2016 | Caramma | |
| 10,991,379 | B2 | 4/2021 | Hijazi et al. | |
| 2008/0208572 | A1 | 8/2008 | Nongpiur et al. | |
| 2008/0300866 | A1 | 12/2008 | Mukhtar et al. | |
| 2009/0030699 | A1 | 1/2009 | Iser et al. | |
| 2011/0257980 | A1 | 10/2011 | Gao | |
| 2018/0308505 | A1 * | 10/2018 | Chebiyyam | G10L 21/038 |
| 2019/0043516 | A1 | 2/2019 | Germain et al. | |
| 2021/0166705 | A1 | 6/2021 | Chang et al. | |

(Continued)

FOREIGN PATENT DOCUMENTS

| | | | |
|---|---|---|---|
| KR | 20190019688 | A | 2/2019 |
| WO | 2010066861 | A2 | 6/2010 |

OTHER PUBLICATIONS

Andreev, P., et al., "HiFi++: a Unified Framework for Bandwidth Extension and Speech Enhancement," https://arxiv.org/abs/2203.13086v3, Jul. 30, 2023, 13 pages.

(Continued)

*Primary Examiner* — Bryan S Blankenagel
(74) *Attorney, Agent, or Firm* — Edell, Shapiro & Finnan, LLC

(57) ABSTRACT

Techniques for speech bandwidth extension and denoising. The techniques integrate data-driven artificial intelligence (AI) models specifically trained to be robust to myriad of distortions. The system is capable of producing high-fidelity wideband speech from real-life narrowband inputs. The output is consistently preferred by listeners over the narrowband input, as well as over denoising alone.

20 Claims, 7 Drawing Sheets

(56) References Cited

U.S. PATENT DOCUMENTS

| | | | | |
|---|---|---|---|---|
| 2022/0059114 | A1* | 2/2022 | Emanuel | G10L 21/0224 |
| 2022/0068285 | A1* | 3/2022 | Xiao | G10L 19/0204 |
| 2023/0162725 | A1 | 5/2023 | Jin et al. | |

OTHER PUBLICATIONS

Choi, H-S., et al, "Phase-Aware Speech Enhancement With Deep Complex U-Net," ICLR 2019 Conference Blind Submission, Dec. 20, 2018, 20 pages.

Defossez, A., et al, "High Fidelity Neural Audio Compression," https://arxiv.org/abs/2210.13438, Oct. 24, 2022, 19 pages.

Ephraim, Y., et al., "Speech Enhancement Using a Minimum Mean-Square Error Short-Time Spectral Amplitude Estimator," IEEE Transactions on Acoustics, Speech, and Signal Processing, vol. 32, Issue: 6, https://ieeexplore.ieee.org/document/1164453, Dec. 1984, 13 pages.

Epps, J., et al, "A New Technique for Wideband Enhancement of Coded Narrowband Speech," IEEE Workshop on Speech Coding Proceedings. Model, Coders, and Error Criteria (Cat. No.99EX351), https://ieeexplore.ieee.org/document/78152, Jun. 1999, 3 pages.

Fuemmeler, J.A., et al, "Techniques for the Regeneration of Wideband Speech from Narrowband Speech," EURASIP Journal on Applied Signal Processing, https://www.researchgate.net/publication/26532635_Techniques_for_The_Regeneration_of_Wideband_Speech_from_Narrowband_Speech, Dec. 2001, 9 pages.

Kong, J., et al, "HiFi-GAN: Generative Adversarial Networks for Efficient and High Fidelity Speech Synthesis," 34th Conference on Neural Information Processing Systems, https://arxiv.org/abs/2010.05646, Oct. 23, 2020, 14 pages.

Larsen, E., et al, "Audio Bandwidth Extension," Application of Psychoacoustics, Signal Processing and Loudspeaker Design, https://www.sps.tue.nl/rmaarts/BWE_Book/bwebook.html, Sep. 2004, 3 pages.

Li, Y., et al, "Real-Time Speech Frequency Bandwidth Extension," https://arxiv.org/abs/2010.10677v2, Feb. 9, 2021, 5 pages.

Lim, J.H., et al, "Geometric GAN," https://arxiv.org/abs/1705.02894, May 9, 2017, 17 pages.

Macartney, C., et al, "Improved Speech Enhancement with the Wave-U-Net," https://arxiv.org/abs/1811.11307, Nov. 27, 2018, 5 pages.

NVIDIA Maxine, "Reinventing Real-Time Video Communication with AI," NVIDIA Developer, https://developer.nvidia.com/maxine#resources, downloaded from Internet on Aug. 11, 2023, 12 pages.

Su, J., et al., "Bandwidth Extension is All You Need," IEEE International Conference on Acoustics, Speech and Signal Processing (ICASSP), https://ieeexplore.ieee.org/document/9413575, Jun. 2021, 5 pages.

Taher, T., et al., "A Joint Bandwidth Expansion and Speech Enhancement Approach using Deep Neural Network," International Conference on Electrical, Computer and Communication Engineering (ECCE), https://ieeexplore.ieee.org/document/10101546, Apr. 19, 2023, 4 pages.

Yamamoto, R., et al., "Parallel Wavegan: a Fast Waveform Generation Model Based on Generative Adversarial Networks With Multi-Resolution Spectrogram," https://arxiv.org/abs/1910.11480, Feb. 6, 2020, 5 pages.

Hendriks R.C., et al., "DFT-Domain Based Single-Microphone Noise Reduction for Speech Enhancement", A Survey of the State-of-the-Art, Synthesis Lectures on Speech and Audio Processing, Jan. 2013, 84 Pages.

* cited by examiner

500

STRUCTURED EXTENSION OF SPEECH BANDWIDTH WITH DENOISING

CROSS REFERENCE TO RELATED APPLICATION

This application claims priority to U.S. Application No. 63/470,005, filed May 31, 2023, the entirety of which is incorporated herein by reference.

TECHNICAL FIELD

The present disclosure relates to processing speech audio.

BACKGROUND

Phone calls over narrowband telephone channels, such as over Public Switched Telephone Network (PSTN) landlines and over a subset of mobile phone calls, have speech content limited to below 4 kHz. This bandwidth limitation degrades both speech quality and intelligibility, and thus has an adverse effect on speech communication and on the overall call experience. Specifically, the missing high frequencies mean lower clarity of speech and fewer speech cues for robust communication in noise. The listeners compensate by increasing their listening effort, which leads to fatigue. One-on-one and conference calls with dial-in participants are affected. Classical bandwidth extension approaches are predominantly suited to clean speech, and hence are either unable to offer benefits in challenging real-life communication conditions or can actually degrade the signal, e.g., by attempting to erroneously extend non-speech components.

DESCRIPTION OF EXAMPLE EMBODIMENTS

Overview

Presented herein are techniques for speech bandwidth extension and denoising. In one form, the techniques involve a method that includes obtaining a narrowband signal containing speech audio and noise from a communication channel; generating a spectra of the narrowband signal; applying the narrowband signal to at least one neural network-based classifier that derives a high frequency replacement spectra that is a prediction of high frequency content for replacement in the spectra of the narrowband signal; replacing content above a cut-off frequency of the spectra of the narrowband signal with the high frequency replacement spectra to produce a bandwidth extended spectra; and processing the bandwidth extended spectra with a deep neural network spectral mask to generate a bandwidth extended enhanced spectra from which noise is suppressed at lower frequencies and enhancement is made at higher frequencies.

EXAMPLE EMBODIMENTS

The techniques integrate data-driven artificial intelligence (AI) models specifically trained to be robust to a myriad of distortions. The system is capable of producing high-fidelity wideband speech from real-life narrowband inputs. The output is consistently preferred by listeners over the narrowband input, as well as over denoising alone.

Figure 1:
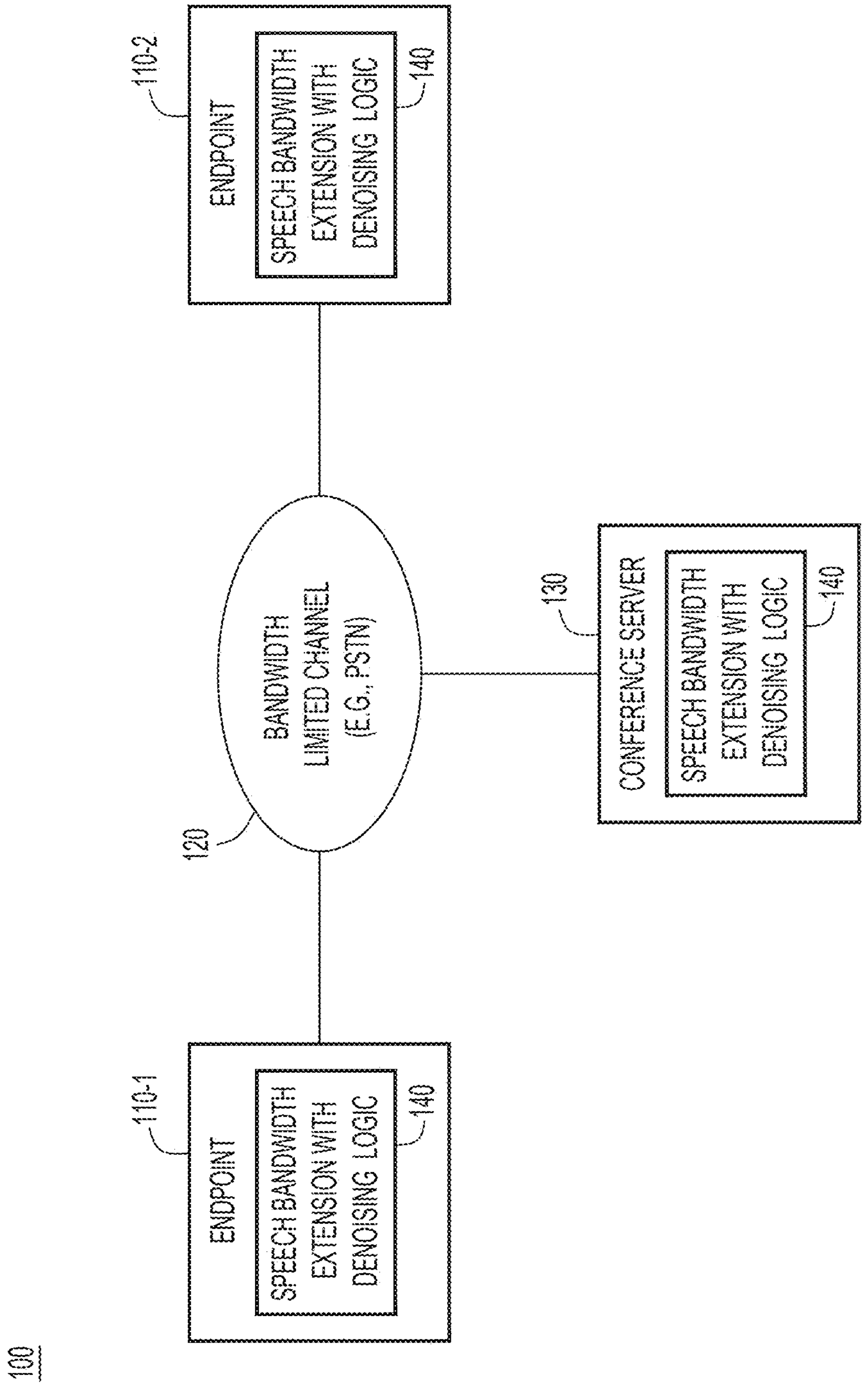
FIG. 1 is a system block diagram depicting communication between endpoints with and without a conference server, and in which the techniques presented herein may be employed, according to an example embodiment.

Reference is first made to FIG. 1. FIG. 1 shows a system 100 that includes endpoint 110-1 and endpoint 110-2 that may be in communication with each other over a bandwidth limited (narrowband) channel 120, such as the Public Switched Telephone Network (PSTN). The endpoints 110-1 and 110-2 may be consumer telephones, business telephones, or other audio or audio/video endpoints that use the bandwidth limited channel 120 for communication of audio. In one form, a conference server 130 may support the audio communication between the endpoints 110-1 and 110-2. It should be understood that there may be more than two endpoints in a given communication session in which audio communication is being supported between the endpoints.

According to the techniques presented herein, each endpoint 110-1 and 110-2 and/or the conference server 130 may execute speech bandwidth extension with denoising logic 140 to perform a process, described below in connection with FIGS. 2, 3A, 3B and 4, that results in improved speech audio at the endpoints 110-1 and 110-2.

Figure 2:
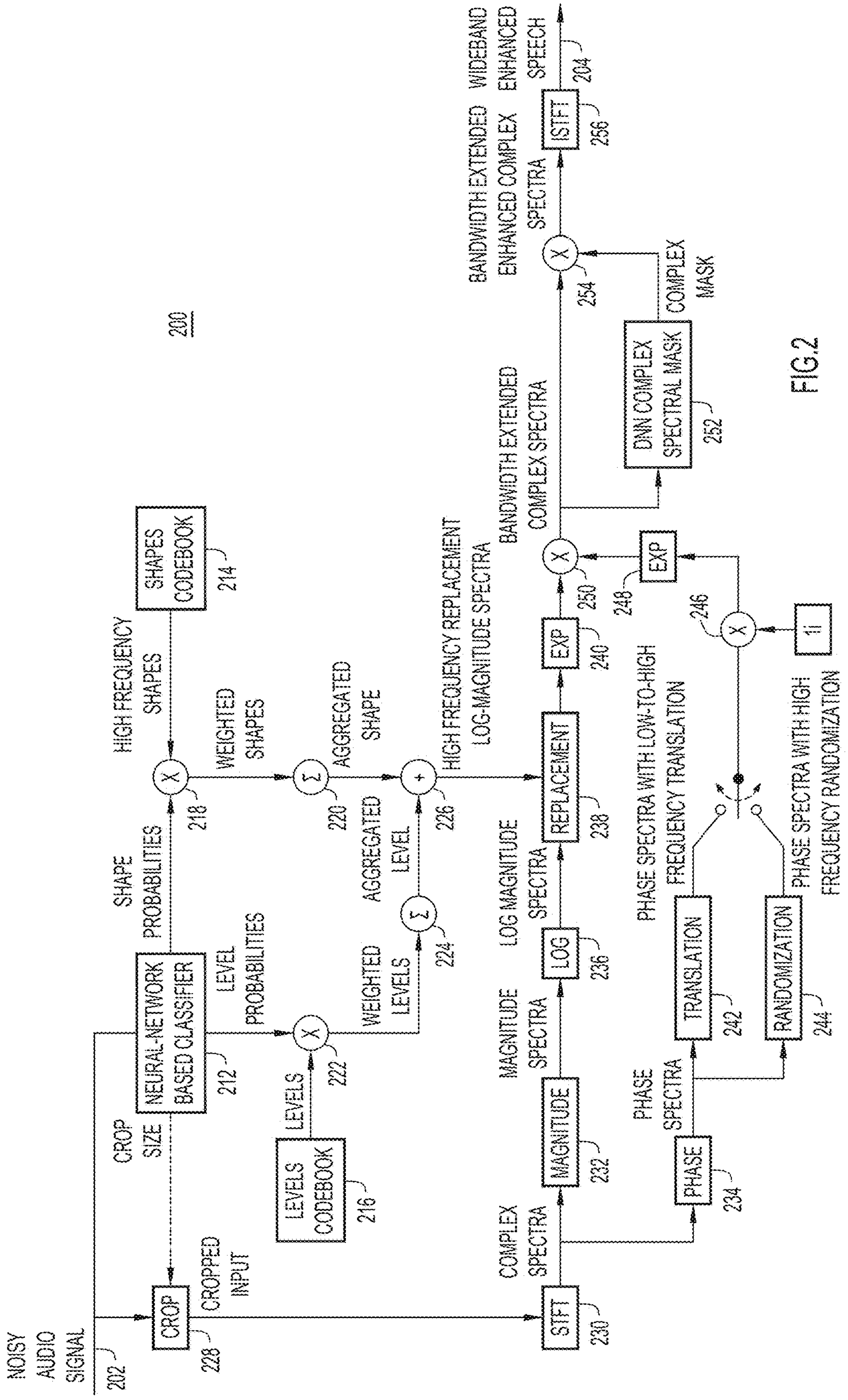
FIG. 2 is a flow diagram of a process that extends the bandwidth and reduces noise in audio signals communicated over narrowband channels, according to an example embodiment.

Reference is now made to FIG. 2, with continued reference to FIG. 1. FIG. 2 shows a flow diagram of a process 200 that is performed when an endpoint 110-1, 110-2 and conference server 130 execute the speech bandwidth extension with denoising logic 140. The process 200 accepts a narrowband (such as less than 4 kHz bandwidth) input audio (speech) signal 202, potentially degraded by noise, reverberation, speech codecs (including at low bitrates) and/or other types of distortions. The process 200 produces a clean (denoised, de-reverberated, undistorted) wideband speech audio 204. The narrowband input signal 202 may be represented as three dimensional tensors: (batch size, 1, number of samples), such as (1, 1, 41258).

The noisy audio signal 202, which is in the time-domain, is fed into a neural-network based classifier 212. The neural-network based classifier 212 may be a light-weight (low-complexity) deep neural network (DNN) classification model, which predicts "crude" (smooth and approximate) high frequency spectral shapes (spectral log-magnitudes) from a codebook of possible shapes, as well as levels (power offsets) for such shapes. On a bandwidth limited channel, such as the PSTN, the noisy audio signal 202 has missing information above 4 kHz. The neural-network based classifier predicts that missing information.

As shown in FIG. 2, the neural-network based classifier 212 generates spectral shape probabilities and level probabilities. The neural-network based classifier 212 uses a shapes codebook 214 and a levels codebook 216. The shapes codebook 214 includes a table of high frequency shapes that may be present in speech audio and the levels codebook 216 similarly includes a table of quantization levels of the shapes that may be present in speech audio. The neural-network based classifier 212 predicts high frequency shapes, with an associated probability, are present in the noisy audio signal 202, and at what level the high frequency shapes are present, with an associated probability. The outputs of the neural-network based classifier 212 are predictions that may be represented as four dimensional tensors: (batch size, number of channels e.g., 2 or classifier outputs e.g., 128, frame index, frequency index), such as (1, 128, 305-1, 1), where "305-1" denotes a crop of 1.

An overall spectral shape is generated by weighting the shape codebook entries from the shape codebook 214 by their prediction probabilities at step 218 to produce weighted shapes, and summing them together at step 220 to produce a single aggregate shape (which is a vector). In one example, the number of codebook vectors for the shape codebook entries is 64 and a dimensionality of each codebook vector (corresponding to the number of frequency bins) is 48. Moreover, in one example, the codebook is made to be zero mean across the frequency bins for each of the codebook entries. In one example, the high frequency replacement log-magnitude spectra may be of the 4-dimensional tensor form (1, 1, 304, 48).

As an example, the shape codebook entries are of dimension (48, 64), meaning there are 64 shape entries each with 48 frequency bins, which can be denoted:

$$c_i,\ i=1, \ldots 64,\ c \in \mathbb{R}^{48}$$

The shape probabilities output by the neural-network based classifier 212 are of the form (batch, 1:64, frame, 1) and may be denoted:

$$p_i,\ i = 1, \ldots 64,\ p_i \in \mathbb{R}^1,\ \sum_i p_i = 1.$$

The output of the summing operation at step 220 is a weighted average and may be denoted:

$$hf_i = \sum_i p_i c_i,\ i = 1, \ldots 64,\ hf_i \in \mathbb{R}^{48},$$

and this is for one frame per batch, such that the calculation is repeated for each frame in each batch.

Similarly, the level probabilities output by the neural-network based classifier 212 are used to weight the levels at step 222 to produce weighted levels (predictions) that are aggregated at step 224 to produce an aggregated level, which is a scalar. This scalar may be of the 4-dimensional tensor form (1, 1, 304, 1).

As an example, the quantization levels in the levels codebook 216 may be denoted:

$$q_i,\ i=1, \ldots 64,\ q \in \mathbb{R}^1$$

The level probabilities output by the neural-network based classifier 212 may be denoted:

$$p_i,\ i = 1, \ldots 64,\ p_i \in \mathbb{R}^1,\ \sum_i p_i = 1.$$

The output of the summation at step 224 is a weighted average that may be denoted:

$$\text{level} = \sum_i p_i q_i,\ i = 1, \ldots 64,\ \text{level} \in \mathbb{R}^1$$

and this is for one frame per batch, such that the calculation is repeated for each frame in each batch.

At 226, the aggregated shape is combined in the log-spectral domain with the aggregated level to produce high frequency replacement log-magnitude spectra, also called a high-frequency extension.

At this point, this high frequency replacement log magnitude spectra is somewhat "crude". As one example, the upper 48 bins of 81 unique FFT bins may be used as the high frequency replacement log magnitude spectra, but some other number of bins may be used, such as the upper 43 bins.

Thus, the neural-network based classifier 212 derives a prediction of high frequency content that is used for replacement in a spectra derived from the narrowband input signal to produce a bandwidth extended spectra. The neural network-based classifier 212 performs a first classification to generate high frequency shapes that are weighted to produce an aggregated shape (vector), and a second classification to generate level probabilities that are weighted to produce an aggregated level (scalar), and the aggregated shape and the aggregated level are combined to produce high frequency replacement log-magnitude spectra. Alternatively, instead of shape and/or level classification, a neural network (or other digital signal processing (DSP) or machine learning approach) could be used to perform direct prediction of (i.e., regression to) high frequency spectral shapes and/or levels.

The neural-network based classifier 212 also generates a crop size for use by a crop operation 228 by which the noisy audio signal 202 may be cropped in order to capture enough of the noisy audio signal 202. In one example, the crop size is 16858. The neural-network based classifier 212 crops the input signal because of its design/field of view. That is, it slides neural network filters in the different layers, and the filters have different alignments: left, right, centered, etc., and consequently the overall network can "see into the future" and into the past. However, because there is no padding in the temporal direction-in order to enable streaming support—the input is cropped. Then, to align the neural-network based classifier 212 high frequency shapes with the neural network mask, the input is to be cropped by the neural-network based classifier 212 with a crop size before going through the Short-Time Fourier Transform (STFT) analysis and the subsequent mask application. The neural-network based classifier 212 does not explicitly output the crop size, but as indicated by the dashed or dotted arrow in FIG. 2, the crop size is a design property of the neural-network based classifier 212, that is used by the crop operation 228. Alternatively, in a software implementation, the neural-network based classifier 212 could output its property and feed it to the crop operation.

The noise audio signal 202, after being cropped at the cropping operation 228, is transformed to the complex frequency domain by the STFT operation 230 to produce complex log-magnitude spectra. In one example, the cropped input to the STFT operation 230 is of the 3-dimensional tensor form (1, 1, 24400), based on the crop size 16858. The complex log-magnitude spectra output from the STFT operation 230 may be of the 4-dimensional tensor form (1, 2, 304, 81). The complex log-magnitude spectra are decomposed at magnitude and phase operations 232 and 234, respectively, into polar form, i.e., the magnitude spectra and phase spectra, respectively. The magnitude spectra output by the magnitude operation 232 and the phase spectra output by the phase operation 234 are of the 4-dimensional tensor form (1, 1, 304, 81).

The logarithm (log) operation 236 may be a 20*log 10 computation that converts the magnitude spectra to log magnitude spectra.

Replacement operation 238 involves using the high frequency replacement log-magnitude spectra from the combining operation 226 to replace the high frequency content above a certain cut-off frequency of the log magnitude spectra output from the log operation 236. The selection of the cut-off frequency above which the spectra is replaced is a design choice. For example, the lowest replacement frequency may be 3.3 kHz, or 3.4 kHz, or 3.8 kHz, or 4 kHz, such that above those frequencies the high frequency replacement log magnitude spectra is used. Again, the top 48 bins, for example, of the log magnitude spectra are replaced with the high frequency replacement log-magnitude spectra. For example, if the output of the log operation 236 is x and the high frequency replacement log magnitude spectra output from operation 226 is y, then replacement operation 238 involves replacing the last/top 48 frequency bins from x by 48 bins from y, x[34:81]=y[1:48].

In one implementation, the process 200 operates on audio sampled at 16 kHz. For narrowband speech signals, this means there is no content (perhaps other than noise or representation floor) above 4 kHz. Therefore, the replacement operation 238 involves replacing "nothing" with "something". In other envisioned implementations, the input audio being narrowband, may be sampled at 8 kHz, while producing upsampled and extended 16 kHz output.

Typically, the incoming audio would be sampled at 8 kHz because there is only signal bandwidth of 4 kHz. However, in the process 200, the audio was re-sampled to 16 kHz so that between 4 kHz and 8 kHz, there is just a noise floor. There is no useful content there, no noise, just noise floor. That noise floor gets replaced with predicted speech content—the high frequency replacement log-magnitude spectra derived from the probabilistically weighted synthesis of shapes. This replacement spectra gets placed/inserted into the top of the log-magnitude spectra to produce bandwidth extended log-magnitude spectra.

Figure 3A:
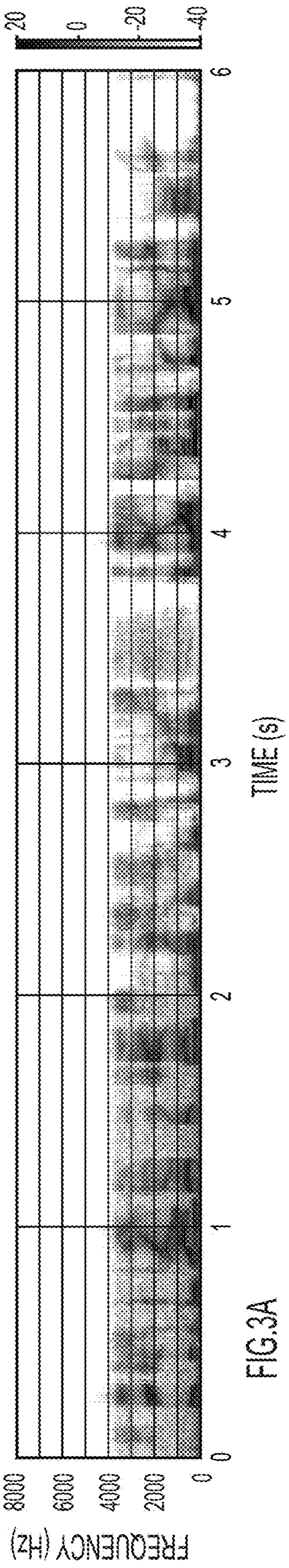
FIGS. 3A-3H are example spectrographs of signals during various stages of the process shown in FIG. 2.
Figure 3B:
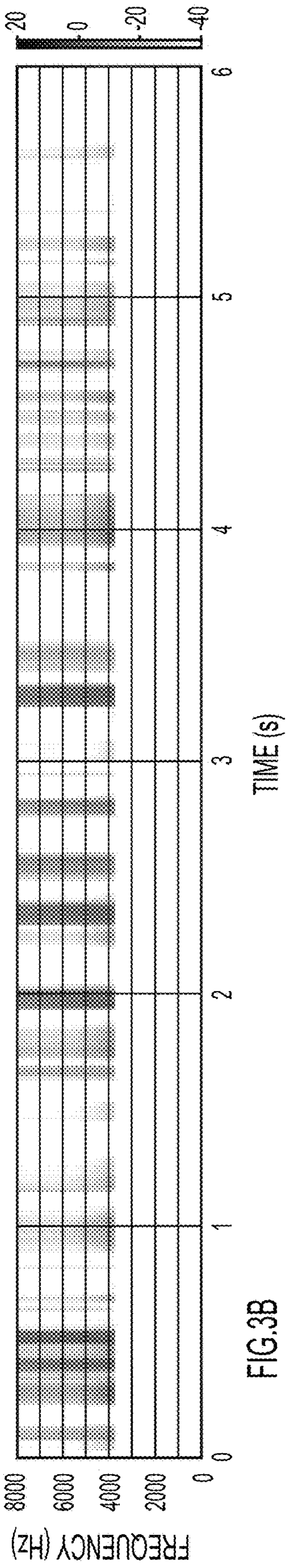
Figure 3C:
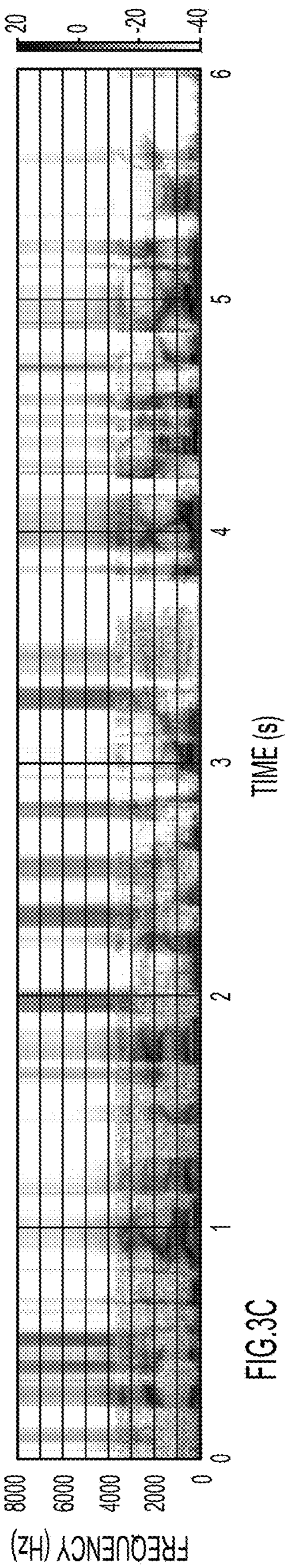

FIGS. 3A-3C are spectrograms that graphically depict the replacement operation 238. The output of the log operation 236 is shown by the spectrogram in FIG. 3A, and shows the log magnitude spectra of an input speech signal. The signal is narrowband—it has no speech components in the upper part of the frequency range. Also, the initial 2 seconds of speech is corrupted by additive noise, and thereafter the remaining speech is relatively clean (free from noise).

FIG. 3B shows the spectrogram for the output of the combining operation 226, which is the log-magnitude spectra for the high frequency replacement. These are the spectral components for the initial (classifier-based) extension of speech bandwidth.

The output of the replacement operation 238 is shown by the spectrogram of FIG. 3C. The replacement operation 238 takes as input the output of the log operation 236—narrowband speech log magnitude spectrum (the spectrogram of which is shown in FIG. 3A) and replaces the frequency components above a replacement frequency with those generated at the output of the combining operation 226 (the spectrogram for which is shown in FIG. 3B).

After the replacement operation 238, the exponential (exp) operation 240 is performed on the bandwidth extended log-magnitude spectra to convert the bandwidth extended log-magnitude spectra back to the magnitude spectra domain, to produce bandwidth extended magnitude spectra. For example, the exp operation 240 is $10^{(z/20)}$-eps, where z is the output of the replacement operation 238.

In order to recombine to the complex spectra, the phase spectra is to be considered. From 0 to 4 kHz, there is phase spectra of the noisy audio signal and from 4 kHz to 8 kHz it is the phase spectra of the noise floor. To simplify this, the phase at high frequencies is seeded by translating the phase from 0 kHz to 4 kHz, to 4 kHz to 8 kHz. Thus, the phase spectra output from operation 234 is run through a translation operation 242 that translates the phase spectra from low to high frequency. For example, if the input to the translation operation 242 is p, then the translation operation 242 involves replacing the last 48 bins from p as: p[34:66]=p [1:33], and p[67:81]=p[1:15].

As an alternative, a randomization operation 244 may be performed by which the phase spectra is subject to high frequency randomization. For example, if the input to the randomization operation 244 is p, then the randomization operation 244 involves replacing the last 48 frequency bins from p by uniform random values between −pi to pi as: p[34:81]=U [−pi, pi]. In a variation, the phase of the wideband signal/the higher frequency components could be estimated using other means, such as for example, prediction by a DNN. Phase could also be obtained using iterative reconstruction, or one or more recently developed (faster, possibly non-iterative) approximations.

Either the phase spectra with low-to-high frequency translation output by the translation operation 242 or the phase spectra with high frequency randomization output by the randomization operation 244 is multiplied with the complex number 1i at 246 followed by the exponential operation 248.

The output of the exponential operation 240 for the magnitude spectra and the output of the exponential operation 248 for the phase spectra are multiplied together at operation 250 to produce bandwidth extended complex spectra. The bandwidth extended complex spectra may have the 4-dimensional tensor form: (1, 2, 304, 81), where the second tensor dimension contains the real and imaginary components of the bandwidth extended complex spectra.

The bandwidth extended complex spectra is then processed with a DNN multiplicative complex spectral mask 252. This DNN complex spectral mask 252 may be determined by a high-capacity DNN model. Thus, this operation involves taking the "crude" initial phase and magnitude estimates, and adjusting those with a spectral mask. The spectral mask has two functions. At lower frequencies (e.g., 0 kHz to 4 kHz), it removes any noise, reverberation, and/or other distortions, e.g., due to a speech codec. At high frequencies, the spectral mask was trained in such a way to reshape and add the fine detail for the bandwidth extension components to sound pleasing to the car. This may be achieved by generative adversarial network (GAN) training of the DNN model, which produces new content/components based on some excitation. Another type of generative model may be used, such as a stable diffusion model that may perform a direct prediction of the enhanced signal type of the model. In this context, the new components are conditioned on the "crude" shapes and the masking mechanism produces a more refined and detailed speech audio.

The output of the DNN complex spectral mask 252 is a complex mask that, at operation 254, is multiplied with the bandwidth extended complex spectra to produce bandwidth extended enhanced complex spectra that is then provided to an inverse short-time Fourier transform (ISTFT) 256 and overlap-add (OLA) synthesis to produce as output the wideband enhanced (denoised and de-reverberated) speech audio 204 in the time domain.

As mentioned above, in one example, the DNN complex spectral mask 252 is a generative adversarial network (GAN)-trained neural network. The generative adversarial training used for the DNN spectral mask contributes to achieving high quality extension of speech bandwidth. Careful data curation (selection of only wideband training samples, selection of training samples based on phonetic content, etc.) and augmentations (noise, reverberation, shaping, saturation, codecs, codec chains, band-limiting with random cut-off frequencies, etc.) used for the GAN training may result in a robust extension and denoising in the presence of a myriad of distortions encountered in real-life scenarios.

The following is an example of how the generative adversarial training may be performed. First, the neural-network based classifier may be trained on its own with appropriate cost functions so as to achieve accurate classification of shapes and levels. The loss terms may, for example, include the cross-entropy loss (potentially along with the L1 loss, to discourage errors in level predictions). A classifier checkpoint with best performance may be then selected and its weights are frozen (i.e., its weights are no longer adapted). The frozen classifier model is then used to predict the codebook shapes and levels during the training of the DNN model for estimating the DNN complex spectral mask 252. This subsequent training may comprise the following steps.

(a) In the first step, the DNN model for the complex mask prediction, referred to as the generator (G) network, is trained on its own until its loss converges. Traditional distance [e.g., 1, 2] and correlation-based loss functions [e.g., 3] can be used. Despite achieving the best denoising performance (at low frequencies), the standalone G network produces highly smoothed (averaged) spectral shapes (specifically at the high frequencies) which are close to the original spectra in the average sense. However, these spectral shapes offer only limited benefit in terms of speech quality, given the lack of intricate fine structure of speech. This model then forms an initialization for the generative adversarial training described below.

(b) In the second step, a discriminator (D) network, which takes the form of a classifier, is trained alone (i.e., with G frozen) and fed with real (wideband ground truth examples from the training data) and fake (enhanced and bandwidth extended examples produced by the frozen generator G) examples. The job of the discriminator is to classify the real and fake examples correctly using, e.g., the hinge loss [1, 4] function. Through this step, an initialization of D for generative adversarial training is obtained. The capacities of the D and G networks may be appropriately balanced, such that one does not dominate over the other.

(d) In the last step, both G and D are trained simultaneously. Specifically, G is trained to fool D. That is, G is trained to produce denoised and bandwidth extended speech that is perceptually closer to the wideband clean speech, such that D classifies the outputs of G as real. On the other hand, D learns to correctly classify the outputs of G as fake. Training of both G and D is done in the above-described adversarial manner until convergence.

In general, during training, the loss terms are calculated during the forward pass. These are used to estimate gradients, which, in turn, are used to update weights of G & D networks during backward propagation.

The following detailed steps are involved in G & D training.

1. First, the loss terms that are responsible for weight updates of G are calculated:
   a. D is frozen (i.e., its weights are not adapted during the backward pass).
   b. Real and fake examples are fed to D to obtain real and fake classification scores.
   c. Two loss terms are calculated using the discriminator's output scores.
      i. Hinge loss [1, 4]: as the job of G is to generate examples that are close to the training data, hinge loss is calculated between fake scores and the true label (=1).
      ii. Feature matching loss [5, 6]: it is the L1 loss calculated between features extracted from intermediate layers of D when fed with real and fake examples.

2. Second, the loss terms that are responsible for weight updates of D are calculated:
   a. The forward pass of the G network is used to produce fake examples for D network training. The G network is then detached from the computation graph to avoid the gradient computations for weights of G. This facilitates the updates for D only.
   b. Real and fake examples are fed into the D network to obtain classification scores.
   c. Hinge loss for real and fake examples is calculated separately with true labels being 1 and −1 respectively.
   d. Averages of both real and fake hinge loss values give an estimate of the overall discriminator loss.

3. The adversarial loss terms calculated in steps 1*c-i*, 1*c-ii* and 2-*c* are then averaged as per desired weightage to obtain overall adversarial loss.

4. Finally, the weighted average of adversarial and traditional losses (with which G in step b is trained) is used to update weights of the entire network during a backward pass.

Alternatively, steps (a) and (b) may be omitted, and the training may commence directly from step (c).

Figure 3D:
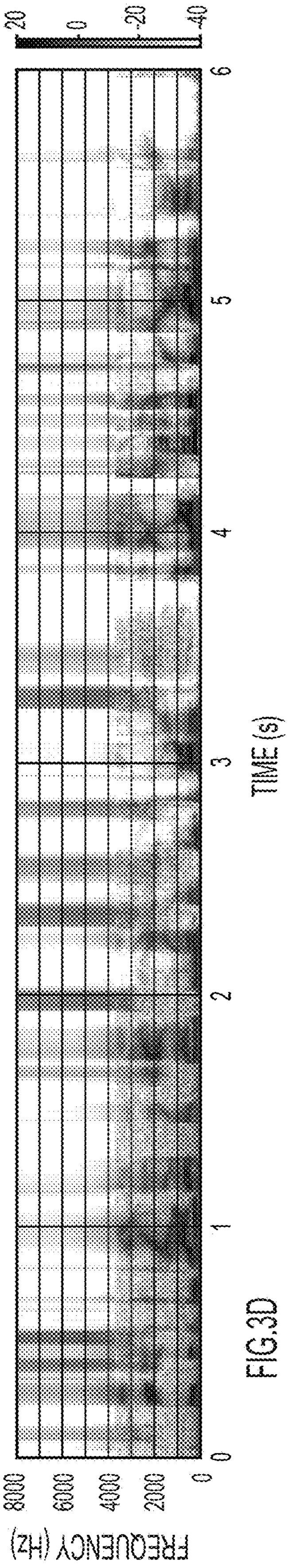

FIGS. 3D-3H are spectrograms that graphically depict the bandwidth extended enhanced complex spectra output by the operation 254, that is, the output of the masking operation from which the wideband extended and denoised speech audio is generated in the time domain. FIG. 3D shows a spectrogram of the magnitude of the complex spectral output from operation 250, the log magnitude spectra with narrowband speech components from the input signal and high frequency replacement components generated by the neural-network based classifier 212.

Figure 3E:
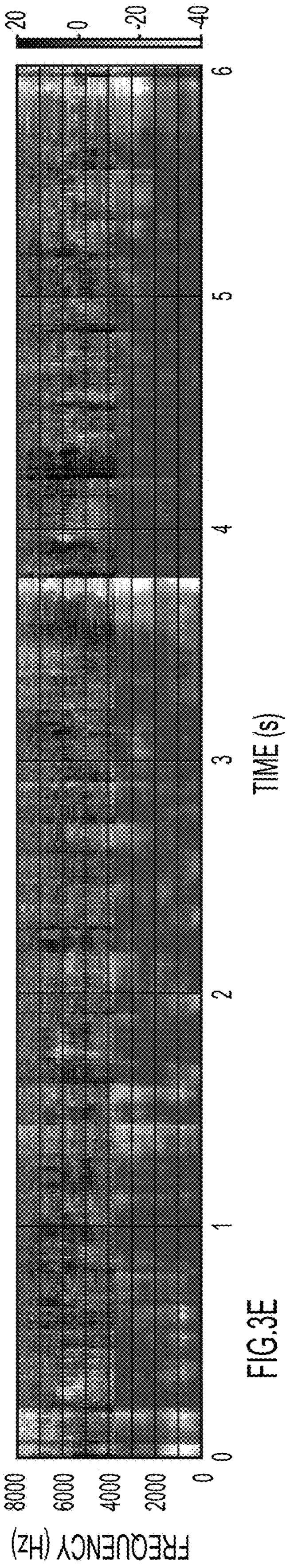

FIG. 3E shows a spectrogram of the magnitude of the complex mask generated by DNN complex spectral mask 252. The mask is capable of amplification and attenuation. In some embodiments, the amplification may be limited, without adverse effects on the speech intelligibility benefit. Also, the mask is complex, and the effect of phase is not represented in FIG. 3E, for simplicity.

Figure 3F:
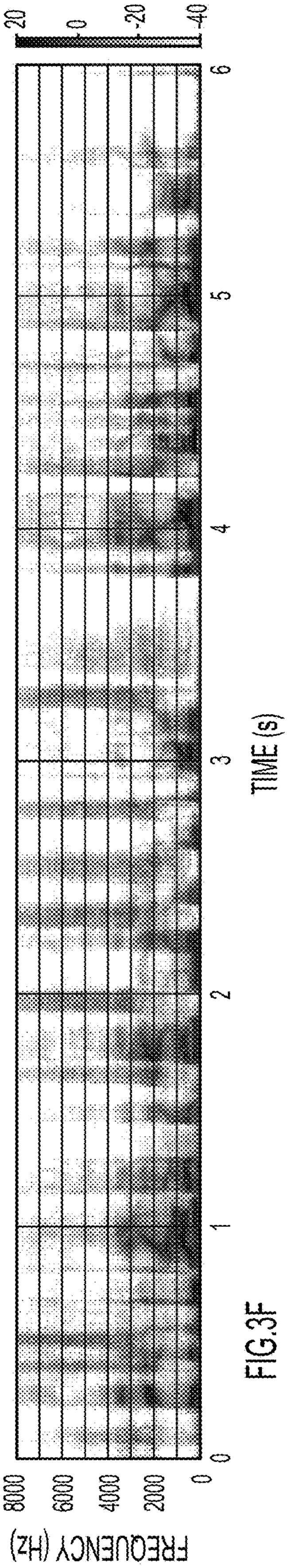

FIG. 3F shows a spectrogram of the magnitude of the complex spectra resulting from complex mask application to the bandwidth extended complex spectra, in operation 254. This output is before inverse transform (ISTFT and overlap-add synthesis at operation 256), the result of which is shown in FIG. 3H.

Figure 3G:
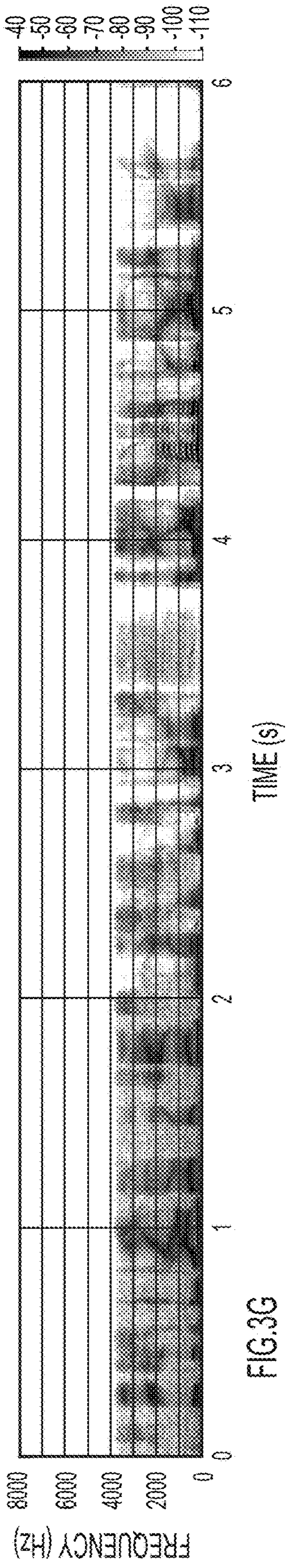

The spectrogram of the narrowband noisy input signal 202 is shown in FIG. 3G. The spectrogram of the wideband enhanced speech audio 204 is shown in FIG. 3H.

Note that FIGS. 3A-3F utilized spectral analysis settings that the algorithm uses: 160 sample frame length, 80 sample frame shift, no zero padding, Hann window. Thus, the visualization resolution of that internal algorithm representation is somewhat limited.

Figure 3H:
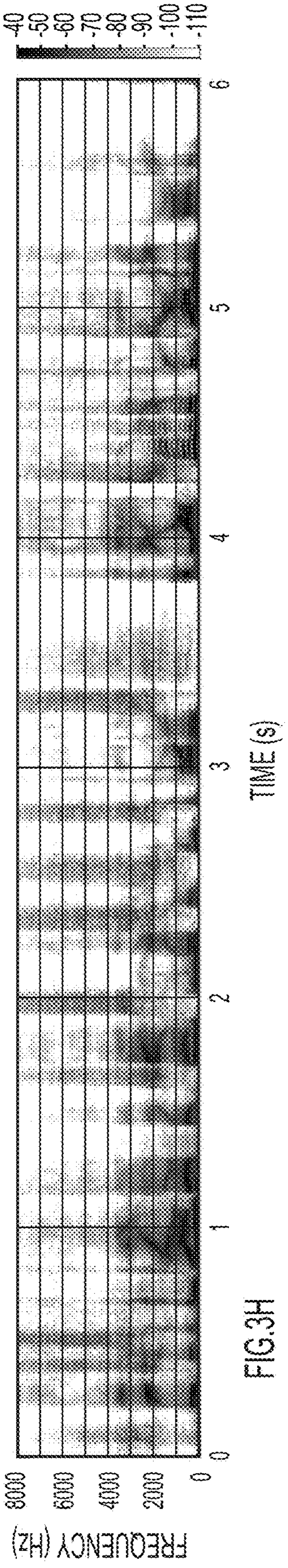

On the other hand, the spectrographic analyses of the input and output signals shown in FIGS. 3G and 3H utilize higher resolution settings (320 sample frame length, 64 sample frame shift, length of FFT via zero padding set to 4096, and Hann window). Hence, finer spectral details are depicted in FIGS. G and H. Furthermore, the effect of overlap-add synthesis also has an impact on the result of the re-analysis of the output shown in FIG. 3H.

Figure 4:
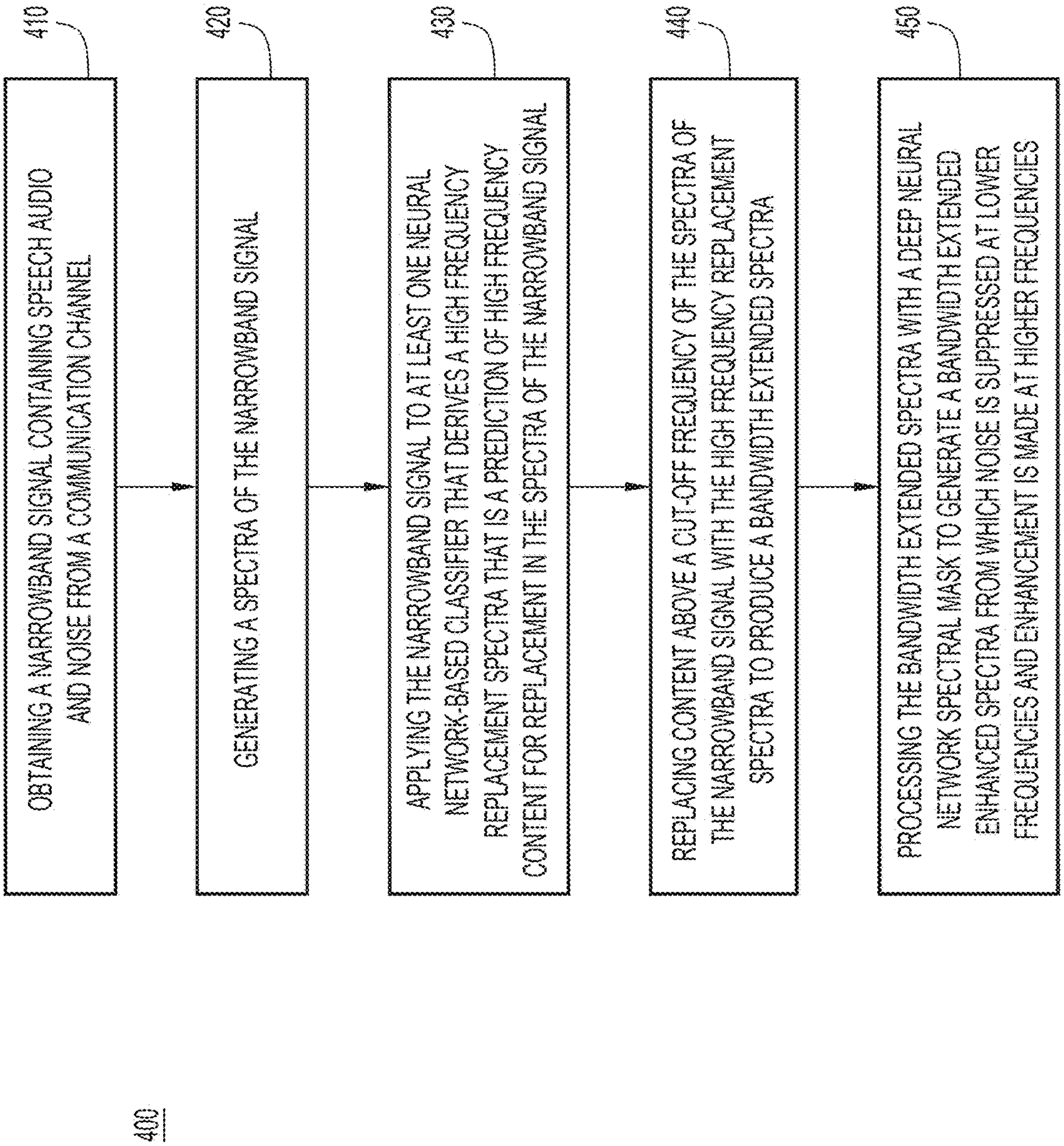
FIG. 4 is a flow chart depicting operations of a method according to an example embodiment.

Reference is now made to FIG. 4. FIG. 4 shows a flow chart of a method 400 according to an example embodiment. The method 400 may be performed by any of the endpoints shown in FIG. 1 and/or by the conference server, by executing the speech bandwidth extension with denoising logic 140. Reference is also made to FIG. 2 for purposes of the description of FIG. 4.

The method 400 includes, at step 410, obtaining a narrowband signal containing speech audio and noise from a communication channel. Step 410 may be achieved by an endpoint device receiving an incoming audio signal during a call with another endpoint device or during a conference session managed by a conference server.

At step 420, the method 400 includes generating a spectra of the narrowband signal. As shown in FIG. 2, this may involve applying the narrowband signal to a STFT, as an example.

At step 430, the method 400 includes applying the narrowband signal to at least one neural network-based classifier that derives a high frequency replacement spectra that is a prediction of high frequency content for replacement in the spectra of the narrowband signal.

At step 440, the method 400 includes replacing content above a cut-off frequency of the spectra of the narrowband signal with the high frequency replacement spectra to produce a bandwidth extended spectra.

At step 450, the method 400 includes processing the bandwidth extended spectra with a deep neural network spectral mask to generate a bandwidth extended enhanced spectra from which noise is suppressed at lower frequencies and enhancement is made at higher frequencies.

The techniques presented herein involve noise-robust classifier-based extended shape synthesis from noisy narrowband inputs, followed by denoising (at low frequencies) and quality-improving "refinement" (at high frequencies) via application of a GAN-trained complex-mask in the STFT domain. These techniques have relatively low complexity, and are readily amenable to low-latency streamable real-time implementations useful in telecommunication applications. The techniques can produce high-fidelity wideband speech from real-life narrowband input, resulting in improved speech quality and intelligibility in human listening tests.

Figure 5:
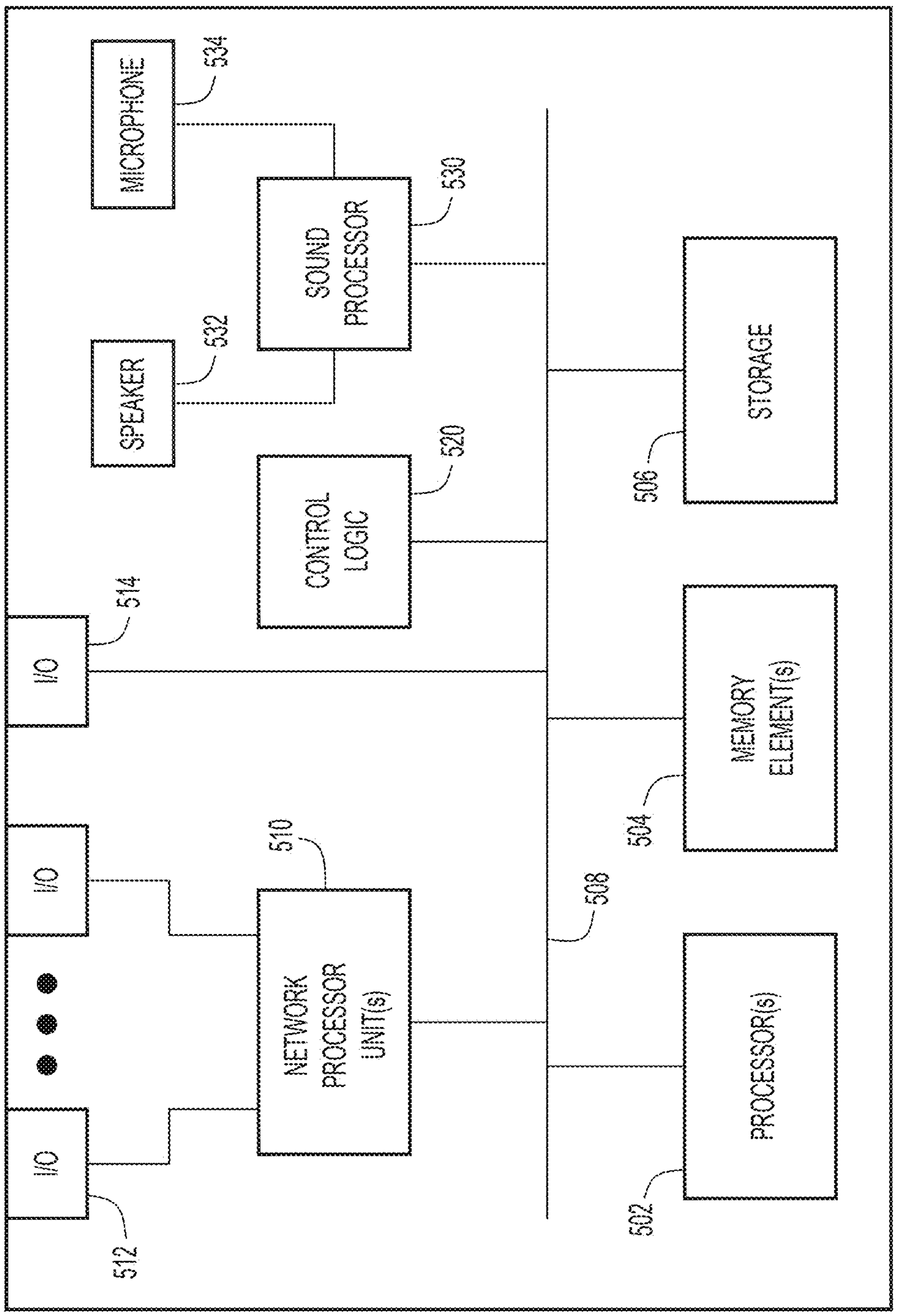
FIG. 5 is a hardware block diagram of a device that may be configured to perform the techniques presented herein, according to an example embodiment.

FIG. 5 is a hardware block diagram of a networking/computing device/apparatus/appliance/endpoint that may perform functions associated with any combination of operations in connection with the techniques depicted in FIGS. 1, 2, 3A, 3B and 4 and described herein. It should be appreciated that FIG. 5 provides only an illustration of one example embodiment and does not imply any limitations with regard to the environments in which different example embodiments may be implemented. Many modifications to the depicted environment may be made.

In at least one embodiment, the computing device 500 may be any apparatus that may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for device 500 as described herein according to software and/or instructions configured for device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 504 and/or storage 506 is/are configured to store data, information, software, and/or instructions associated with device 500, and/or logic configured for memory element(s) 504 and/or storage 506. For example, any logic described herein (e.g., control logic 520) can, in various embodiments, be stored for device 500 using any combination of memory element(s) 504 and/or storage 506. Note that in some embodiments, storage 506 can be consolidated with one or more memory elements 504 (or vice versa), or can overlap/exist in any other suitable manner. In one or more example embodiments, process data is also stored in the one or more memory elements 504 for later evaluation and/or process optimization.

In at least one embodiment, bus 508 can be configured as an interface that enables one or more elements of device 500 to communicate in order to exchange information and/or data. Bus 508 can be implemented with any architecture designed for passing control, data and/or information between processors, memory elements/storage, peripheral devices, and/or any other hardware and/or software components that may be configured for device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In the even the device 500 is an endpoint (such as telephone, mobile phone, desk phone, conference endpoint, etc.), then the device 500 may further include a sound processor 530, a speaker 532 that plays out audio and a microphone 534 that detects audio. The sound processor 530 may be a sound accelerator card or other similar audio processor that may be based on one or more ASICs and associated digital-to-analog and analog-to-digital circuitry to convert signals between the analog domain and digital domain. In some forms, the sound processor 530 may include one or more digital signal processors (DSPs) and be configured to perform some or all of the operations of the techniques presented herein.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that are capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 506 and/or memory elements(s) 504 can store data, software, code, instructions (e.g., processor instructions), logic, parameters, combinations thereof, and/or the like used for operations described herein. This includes the storage 506 and/or memory elements(s) 504 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method including: obtaining a narrowband signal containing speech audio and noise from a communication channel; generating a spectra of the narrowband signal; applying the narrowband signal to at least one neural network-based classifier that derives a high frequency replacement spectra that is a prediction of high frequency content for replacement in the spectra of the narrowband signal; replacing content above a cut-off frequency of the spectra of the narrowband signal with the high frequency replacement spectra to produce a bandwidth extended spectra; and processing the bandwidth extended spectra with a deep neural network spectral mask to generate a bandwidth extended enhanced spectra from which noise is suppressed at lower frequencies and enhancement is made at higher frequencies.

In some aspects, the techniques described herein relate to a method, wherein the at least one neural network-based classifier performs a first classification to generate high frequency shape probabilities that are weighted to produce an aggregated shape component and a second classification to generate level probabilities that are weighted to produce an aggregated level component, wherein the aggregated shape component and the aggregated level component are combined to produce the high frequency replacement spectra.

In some aspects, the techniques described herein relate to a method, wherein the first classification of the at least one neural network-based classifier generates the high frequency shape probabilities which are a prediction of high frequency shapes, among a plurality of stored high frequency shapes, are present in the narrowband signal, and the second classification of the at least one neural network-based classifier generates the level probabilities which are a prediction of levels, among a plurality of stored levels, of high frequency shapes predicted to be present in the narrowband signal.

In some aspects, the techniques described herein relate to a method, wherein the aggregated shape component is a vector and the aggregated level component is a scalar, and when combined, produce the high frequency replacement spectra that is in a log-magnitude domain.

In some aspects, the techniques described herein relate to a method, wherein generating a spectra of the narrowband signal includes applying a Short-Time Fourier Transform operation on the narrowband signal to produce a complex spectra.

In some aspects, the techniques described herein relate to a method, further including: generating from the complex spectra a magnitude spectra and a phase spectra; and performing a logarithm operation on the magnitude spectra to produce log-magnitude spectra, wherein replacing includes replacing content in the log-magnitude spectra above a cut-off frequency with the high frequency replacement spectra to produce bandwidth extended log-magnitude spectra.

In some aspects, the techniques described herein relate to a method, further including: performing a low-to-high frequency translation or high frequency randomization on the phase spectra to produce high frequency phase spectra; converting the high frequency phase spectra to phase spectra; converting the bandwidth extended log-magnitude spectra to bandwidth extended magnitude spectra; and multiplying the phase spectra with the bandwidth extended magnitude spectra to produce bandwidth extended complex spectra.

In some aspects, the techniques described herein relate to a method, wherein processing includes processing the bandwidth extended complex spectra with the deep neural network spectral mask to produce bandwidth extended enhanced complex spectra.

In some aspects, the techniques described herein relate to a method, wherein the deep neural network spectral mask is predicted using a generative adversarial network (GAN)-trained neural network.

In some aspects, the techniques described herein relate to a method, wherein the GAN-trained neural network is trained based on exposure to one or more of: different audio coder/decoder processes, different bitrates, different cut-off frequencies, different spectral shapes, different noises, different reverb and different levels to achieve noise reduction/speech enhancement training.

In some aspects, the techniques described herein relate to a method, further including: transforming the bandwidth extended enhanced complex spectra to a wideband enhanced speech audio signal in the time domain.

In some aspects, the techniques described herein relate to a method, wherein transforming the bandwidth extended enhanced complex spectra includes performing an inverse Short-Time Fourier Transform on the bandwidth extended enhanced complex spectra to produce the wideband enhanced speech audio signal in the time domain.

In some aspects, the techniques described herein relate to an apparatus including: a communication interface configured to receive signals over a communication channel, the signals including a narrowband signal containing speech audio and noise from the communication channel; and a processor (e.g., a signal processor such as a DSP or a computer processor) coupled to the communication interface, the processor configured to perform operations on the narrowband signal including: generating a spectra of the narrowband signal; applying the narrowband signal to at least one neural network-based classifier that derives a high frequency replacement spectra that is a prediction of high frequency content for replacement in the spectra of the narrowband signal; replacing content above a cut-off frequency of the spectra of the narrowband signal with the high frequency replacement spectra to produce a bandwidth extended spectra; and processing the bandwidth extended spectra with a deep neural network spectral mask to generate a bandwidth extended enhanced spectra from which noise is suppressed at lower frequencies and enhancement is made at higher frequencies.

In some aspects, the techniques described herein relate to an apparatus, wherein the at least one neural network-based classifier performs a first classification to generate high frequency shape probabilities that are weighted to produce an aggregated shape component and a second classification to generate level probabilities that are weighted to produce an aggregated level component, wherein the aggregated shape component and the aggregated level component are combined to produce the high frequency replacement spectra.

In some aspects, the techniques described herein relate to an apparatus, wherein the first classification of the at least one neural network-based classifier generates the high frequency shape probabilities which are a prediction of high frequency shapes, among a plurality of stored high frequency shapes, are present in the narrowband signal, and the second classification of the at least one neural network-based classifier generates the level probabilities which are a prediction of levels, among a plurality of stored levels, of high frequency shapes predicted to be present in the narrowband signal.

In some aspects, the techniques described herein relate to an apparatus, wherein the aggregated shape component is a vector and the aggregated level component is a scalar, and when combined, produce the high frequency replacement spectra that is in a log-magnitude domain.

In some aspects, the techniques described herein relate to one or more non-transitory computer readable storage media encoded with instructions that, when executed by a processor, cause the processor to perform operations including: generating a spectra of a narrowband signal containing speech audio and noise from a communication channel; applying the narrowband signal to at least one neural network-based classifier that derives a high frequency replacement spectra that is a prediction of high frequency content for replacement in the spectra of the narrowband signal; replacing content above a cut-off frequency of the spectra of the narrowband signal with the high frequency replacement spectra to produce a bandwidth extended spectra; and processing the bandwidth extended spectra with a deep neural network spectral mask to generate a bandwidth extended enhanced spectra from which noise is suppressed at lower frequencies and enhancement is made at higher frequencies.

In some aspects, the techniques described herein relate to one or more non-transitory computer readable storage media, wherein the at least one neural network-based classifier performs a first classification to generate high frequency shape probabilities that are weighted to produce an aggregated shape component and a second classification to generate level probabilities that are weighted to produce an aggregated level component, wherein the aggregated shape component and the aggregated level component are combined to produce the high frequency replacement spectra.

In some aspects, the techniques described herein relate to one or more non-transitory computer readable storage media, wherein the first classification of the at least one neural network-based classifier generates the high frequency shape probabilities which are a prediction of high frequency shapes, among a plurality of stored high frequency shapes, are present in the narrowband signal, and the second classification of the at least one neural network-based classifier generates the level probabilities which are a prediction of levels, among a plurality of stored levels, of high frequency shapes predicted to be present in the narrowband signal.

In some aspects, the techniques described herein relate to one or more non-transitory computer readable storage media, wherein the aggregated shape component is a vector and the aggregated level component is a scalar, and when combined, produce the high frequency replacement spectra that is in a log-magnitude domain.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A method comprising:

obtaining a narrowband signal containing speech audio and noise from a communication channel;

generating a spectra of the narrowband signal;

applying the narrowband signal to at least one neural network-based classifier that derives a high frequency replacement spectra that is a prediction of high frequency content for replacement in the spectra of the narrowband signal, wherein the at least one neural network-based classifier generates shape probabilities and level probabilities that are each aggregated to produce an aggregated shape component and an aggregated level component that are combined to generate the high frequency replacement spectra;

replacing content above a cut-off frequency of the spectra of the narrowband signal with the high frequency replacement spectra to produce a bandwidth extended spectra; and processing the bandwidth extended spectra with a deep neural network spectral mask to generate a bandwidth extended enhanced spectra from which noise is suppressed at lower frequencies and enhancement is made at higher frequencies.

2. The method of claim 1, wherein the at least one neural network-based classifier performs a first classification to generate high frequency shape probabilities that are weighted to produce the aggregated shape component and a second classification to generate level probabilities that are weighted to produce the aggregated level component.

3. The method of claim 2, wherein the first classification of the at least one neural network-based classifier generates the high frequency shape probabilities which are a prediction of high frequency shapes, among a plurality of stored high frequency shapes, that are present in the narrowband signal, and the second classification of the at least one neural network-based classifier generates the level probabilities which are a prediction of levels, among a plurality of stored levels, of high frequency shapes predicted to be present in the narrowband signal.

4. The method of claim 3, wherein the aggregated shape component is a vector and the aggregated level component is a scalar, and when combined, produce the high frequency replacement spectra that is in a log-magnitude domain.

5. The method of claim 3, wherein generating a spectra of the narrowband signal comprises applying a Short-Time Fourier Transform operation on the narrowband signal to produce a complex spectra.

6. The method of claim 5, further comprising:

generating from the complex spectra a magnitude spectra and a phase spectra; and performing a logarithm operation on the magnitude spectra to produce log-magnitude spectra, wherein replacing comprises replacing content in the log-magnitude spectra above a cut-off frequency with the high frequency replacement spectra to produce bandwidth extended log-magnitude spectra.

7. The method of claim 6, further comprising:

performing a low-to-high frequency translation or high frequency randomization on the phase spectra to produce high frequency phase spectra;

converting the high frequency phase spectra to phase spectra;

converting the bandwidth extended log-magnitude spectra to bandwidth extended magnitude spectra; and multiplying the phase spectra with the bandwidth extended magnitude spectra to produce bandwidth extended complex spectra.

8. The method of claim 7, wherein processing comprises processing the bandwidth extended complex spectra with the deep neural network spectral mask to produce bandwidth extended enhanced complex spectra.

9. The method of claim 8, wherein the deep neural network spectral mask is predicted using a generative adversarial network (GAN)-trained neural network.

10. The method of claim 9, wherein the GAN-trained neural network is trained based on exposure to one or more of: different audio coder/decoder processes, different bitrates, different cut-off frequencies, different spectral shapes, different noises, different reverb and different levels to achieve noise reduction/speech enhancement training.

11. The method of claim 8, further comprising:

transforming the bandwidth extended enhanced complex spectra to a wideband enhanced speech audio signal in the time domain.

12. The method of claim 11, wherein transforming the bandwidth extended enhanced complex spectra comprises performing an inverse Short-Time Fourier Transform on the bandwidth extended enhanced complex spectra to produce the wideband enhanced speech audio signal in the time domain.

13. An apparatus comprising:

a communication interface configured to receive signals over a communication channel, the signals including a narrowband signal containing speech audio and noise from the communication channel; and a processor coupled to the communication interface, the processor configured to perform operations on the narrowband signal including:

generating a spectra of the narrowband signal;

applying the narrowband signal to at least one neural network-based classifier that derives a high frequency replacement spectra that is a prediction of high frequency content for replacement in the spectra of the narrowband signal, wherein the at least one neural network-based classifier generates shape probabilities and level probabilities that are each aggregated to produce an aggregated shape component and an aggregated level component that are combined to generate the high frequency replacement spectra;

replacing content above a cut-off frequency of the spectra of the narrowband signal with the high frequency replacement spectra to produce a bandwidth extended spectra; and processing the bandwidth extended spectra with a deep neural network spectral mask to generate a bandwidth extended enhanced spectra from which noise is suppressed at lower frequencies and enhancement is made at higher frequencies.

14. The apparatus of claim 13, wherein the at least one neural network-based classifier performs a first classification to generate high frequency shape probabilities that are weighted to produce the aggregated shape component and a second classification to generate level probabilities that are weighted to produce the aggregated level component, wherein the aggregated shape component and the aggregated level component are combined to produce the high frequency replacement spectra.

15. The apparatus of claim 14, wherein the first classification of the at least one neural network-based classifier generates the high frequency shape probabilities which are a prediction of high frequency shapes, among a plurality of stored high frequency shapes, that are present in the narrowband signal, and the second classification of the at least one neural network-based classifier generates the level probabilities which are a prediction of levels, among a plurality of stored levels, of high frequency shapes predicted to be present in the narrowband signal.

16. The apparatus of claim 15, wherein the aggregated shape component is a vector and the aggregated level component is a scalar, and when combined, produce the high frequency replacement spectra that is in a log-magnitude domain.

17. One or more non-transitory computer readable storage media encoded with instructions that, when executed by a processor, cause the processor to perform operations including:

generating a spectra of a narrowband signal containing speech audio and noise from a communication channel;

applying the narrowband signal to at least one neural network-based classifier that derives a high frequency replacement spectra that is a prediction of high frequency content for replacement in the spectra of the narrowband signal, wherein the at least one neural network-based classifier generates shape probabilities and level probabilities that are each aggregated to produce an aggregated shape component and an aggregated level component that are combined to generate the high frequency replacement spectra;

replacing content above a cut-off frequency of the spectra of the narrowband signal with the high frequency replacement spectra to produce a bandwidth extended spectra; and processing the bandwidth extended spectra with a deep neural network spectral mask to generate a bandwidth extended enhanced spectra from which noise is suppressed at lower frequencies and enhancement is made at higher frequencies.

18. The one or more non-transitory computer readable storage media of claim 17, wherein the at least one neural network-based classifier performs a first classification to generate high frequency shape probabilities that are weighted to produce the aggregated shape component and a second classification to generate level probabilities that are weighted to produce the aggregated level component, wherein the aggregated shape component and the aggregated level component are combined to produce the high frequency replacement spectra.

19. The one or more non-transitory computer readable storage media of claim 18, wherein the first classification of the at least one neural network-based classifier generates the high frequency shape probabilities which are a prediction of high frequency shapes, among a plurality of stored high frequency shapes, that are present in the narrowband signal, and the second classification of the at least one neural network-based classifier generates the level probabilities which are a prediction of levels, among a plurality of stored levels, of high frequency shapes predicted to be present in the narrowband signal.

20. The one or more non-transitory computer readable storage media of claim 19, wherein the aggregated shape component is a vector and the aggregated level component is a scalar, and when combined, produce the high frequency replacement spectra that is in a log-magnitude domain.

* * * * *